(No Model.)
F. A. WIEBROCK.
FENCE FOR INTERCEPTING INSECTS.
No. 395,678. Patented Jan. 1, 1889.
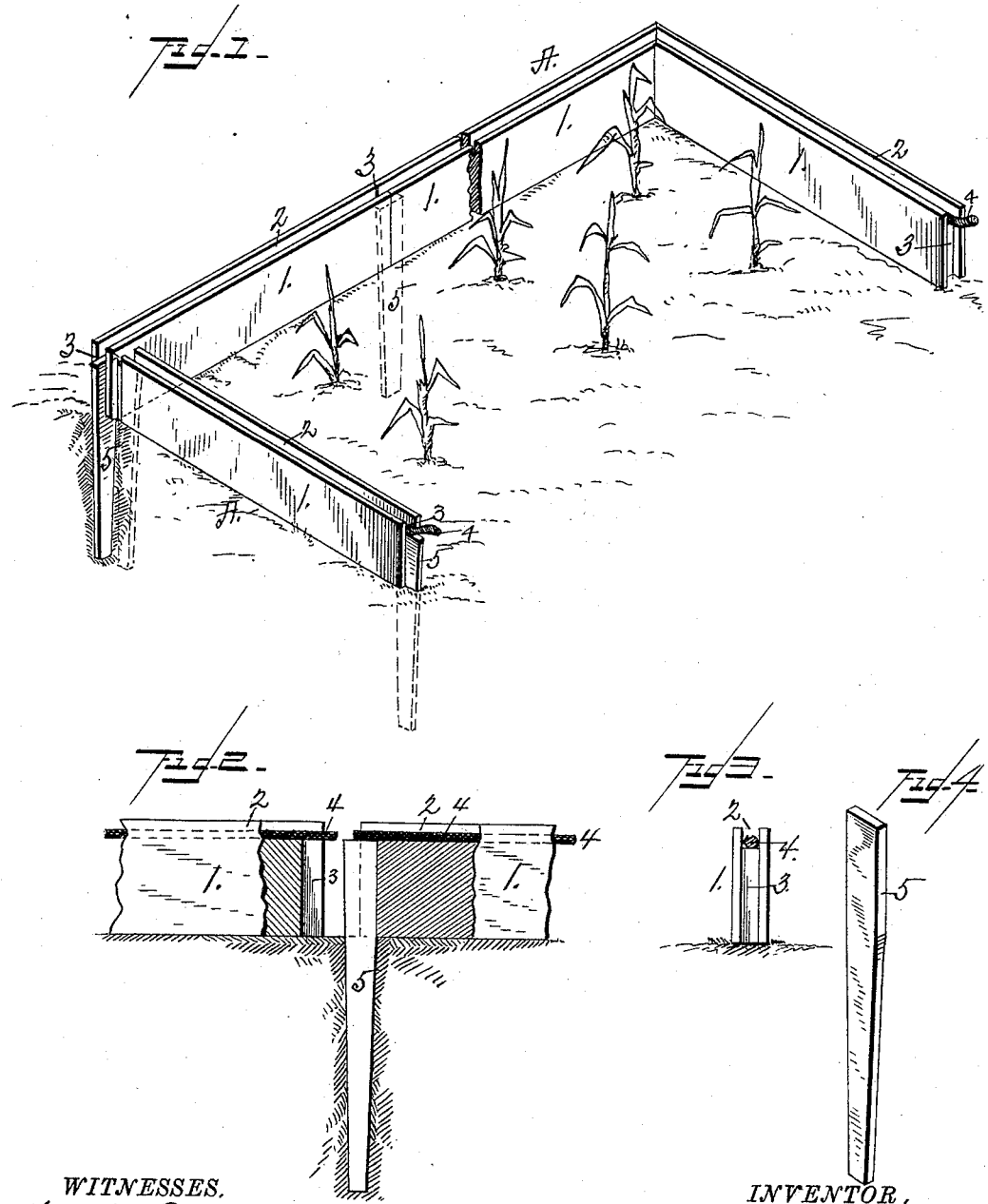
WITNESSES.
F. L. Ourand.
L. C. Wallas.
INVENTOR.
Fred<sup>k</sup> A. Wiebrock.
by A. G. Heylmun,
Attorney.

UNITED STATES PATENT OFFICE.

FREDERICK A. WIEBROCK, OF HUMBOLDT, KANSAS.

FENCE FOR INTERCEPTING INSECTS.

SPECIFICATION forming part of Letters Patent No. 395,678, dated January 1, 1889.

Application filed July 20, 1888. Serial No. 280,458. (No model.)

*To all whom it may concern:*

Be it known that I, FREDERICK A. WIEBROCK, a citizen of the United States of America, residing at Humboldt, in the county of Allen and State of Kansas, have invented a new and useful Fence and Insect-Destroyer, of which the following is a specification.

My invention has relation to means for preventing the approaches or ingress of destructive insects to growing crops and for destroying depredating insects.

My invention therefore consists in a fence or inclosure of particular construction, having aggrouped therewith an insecticide, as hereinafter will be fully described, and specially as the same is particularly pointed out and distinctly claimed.

I have fully illustrated my improvements in the accompanying drawings, wherein—

Figure 1 is a perspective view of my improvement as applied for an inclosure. Fig. 2 is a detail view of the sections of the fence. Fig. 3 is an end view of one of the sections, and Fig. 4 is a view of the post.

Reference being had to the drawings, A designates the fence, composed of sections 1. These consist of board-stuff having a groove, 2, cut in their upper edges and groove 3 cut across each end of each section. In the groove 2 is packed a saturable material, 4—such as a rope or other strand material—which is saturated with any insecticide or fluid which is offensive to the bug, such as coal-oil. The post 5 is driven down at the end of the first section laid, and then another post is driven at the other end of the section, being passed through the grooves in the end of the sections, substantially as seen in the drawings.

To lay the fence, a section is set on the ground with its under edge square upon or slightly in the ground, so that the insects cannot get under it, and a setting-post driven in at the one end. A post is then driven through the groove on the other end of the section, leaving a portion of the side of the post projecting from the groove, and then another section is laid, with its end groove about the projecting end of the post of the other section, and a post driven at the other end of the section, and so on until the requisite number of sections are laid or the inclosure completed. The posts are driven in until their tops reach a point on line with the bottom of the groove in the top of the fence, so as to make a continuous groove in the entire construction. The saturable material is then packed in the groove of the fence, which, it will be observed, is continuous when the fence is laid, and if not already saturated the fluid may be applied.

It will be observed that while the saturable material may be filled with a toxical agent it is not essential, as any agent having the essential of being so offensive to the insects as to turn them in their course when trying to get over the fence will answer the purpose. For the purpose common coal-oil will effect the desired result.

On approaching the fence the insects are warned by the vapors of the oil or other agent and are turned back, retreating only a short distance from the line of fence, where they soon perish.

My invention is particularly applicable to the chinch-bug, which attacks growing wheat and is destructive to growing corn.

The section of the fence or inclosure, it will be perceived by inspection of the drawings, is made of a single narrow board, which may be of common pine or other wood suitable to the purpose. While the material in the groove is preferably a rope or strand, a fluid of the character named may be put in the groove and serve the purpose.

By projecting the posts through end grooves in meeting sections the egress of the bug is effectually prevented.

What I claim is—

1. The insecticide-fence herein described, composed of sections consisting of single narrow boards formed with a groove in their upper edges to receive and retain a substance noxious to insects, and grooves across their ends, and posts arranged in the end grooves of meeting ends of the sections, said posts having their tops arranged on a line with the bottom of the groove in the upper edge of the sections, substantially as described, and for the purpose stated.

2. The insecticide-fence herein described, composed of sections consisting of single narrow boards formed with a groove in their upper edges and grooves across their ends, posts arranged in the end grooves of meeting ends of the sections, said posts having their tops arranged on a line with the bottom of the grooves in the upper edges of the fence, and a saturable material arranged in the top groove of the fence, substantially as described, and for the purpose specified.

3. The insecticide-fence herein described, consisting of single narrow boards having grooves in their upper edges to receive a substance noxious to insects, said sections being laid to form a continual groove between their meeting ends, and posts at the meeting ends of the sections to hold them in line, substantially as described, and for the purpose specified.

In witness whereof I have hereunto set my hand in the presence of two attesting witnesses.

FREDERICK A. WIEBROCK.

Attest:
G. A. NICHOLETTS,
R. J. LITTLEWOOD.